US009688010B2

(12) United States Patent
Song et al.

(10) Patent No.: US 9,688,010 B2
(45) Date of Patent: Jun. 27, 2017

(54) APPARATUS FOR MEASURING SURFACE TEMPERATURE OF MOLDED PRODUCT

(71) Applicant: YUDOSTAR Co., LTD., Incheon (KR)

(72) Inventors: Chang Dong Song, Incheon (KR); Jeong Ho Park, Bucheon-si (KR)

(73) Assignee: YUDOSTAR CO., LTD., Incheon (KR)

( * ) Notice: Subject to any disclaimer, the term of this patent is extended or adjusted under 35 U.S.C. 154(b) by 147 days.

(21) Appl. No.: 14/694,176

(22) Filed: Apr. 23, 2015

(65) Prior Publication Data

US 2016/0144546 A1  May 26, 2016

(30) Foreign Application Priority Data

Nov. 25, 2014 (KR) ........................ 10-2014-0164973

(51) Int. Cl.
*B29C 45/42* (2006.01)
*B29C 45/78* (2006.01)
*B29C 45/76* (2006.01)

(52) U.S. Cl.
CPC .............. *B29C 45/78* (2013.01); *B29C 45/42* (2013.01); *B29C 45/7626* (2013.01); *B29C 2045/7633* (2013.01); *B29C 2945/7604* (2013.01); *B29C 2945/7629* (2013.01); *B29C 2945/76317* (2013.01); *B29C 2945/76421* (2013.01)

(58) Field of Classification Search
CPC ..... B29C 45/42; B29C 45/7626; B29C 45/40; B29C 45/36; B29C 2045/7633; B25J 15/06
See application file for complete search history.

(56) References Cited

U.S. PATENT DOCUMENTS

2008/0038395 A1* 2/2008 Nicol .................. B29C 45/7626
                                                                425/170
2012/0039697 A1* 2/2012 Jin ....................... B25J 15/0616
                                                                414/737

FOREIGN PATENT DOCUMENTS

| JP | 2001205678 | 7/2001 |
| JP | 2007061854 | 3/2007 |
| JP | 2012214008 | 11/2012 |
| KR | 1020080017108 | 2/2008 |
| KR | 1020120077327 | 7/2012 |
| KR | 101478488 | 12/2014 |

* cited by examiner

*Primary Examiner* — Joseph S Del Sole
*Assistant Examiner* — Cedrick Williams
(74) *Attorney, Agent, or Firm* — Cantor Colburn LLP

(57) ABSTRACT

Provided is an apparatus for determining whether a molded product is defective by sensing a surface temperature of a mold or the molded product in a contact type or a non-contact type using an infrared ray, without inserting a temperature sensor in the mold. In an injection mold robot transfer apparatus that includes absorption tools for absorbing a mold and transferring a molded product after determining whether the molded product is defective, the apparatus includes a support bar for fixing the absorption tools and including a vertical recess, a crossbar fixed by the vertical recess of the support bar, a forward and backward shaft fixed by the crossbar, a bracket fixed by the forward and backward shaft, and a temperature sensor fixed on the bracket.

5 Claims, 5 Drawing Sheets

APPARATUS FOR MEASURING SURFACE TEMPERATURE OF MOLDED PRODUCT

CROSS-REFERENCE TO RELATED PATENT APPLICATIONS

This application claims the benefit of Korean Patent Application No. 10-2014-0164973, filed on Nov. 25, 2014, in the Korean Patent Office, the disclosure of which is incorporated herein in its entirety by reference.

BACKGROUND OF THE INVENTION

1. Field of the Invention

The present invention relates to an apparatus for measuring a surface temperature of a molded product, and in particular, to an apparatus for measuring a surface temperature of a molded product for detecting whether the molded product has defects by measuring an outer temperature of a mold or the molded product in a robot transfer apparatus.

2. Description of the Related Art

Patent reference 1 discloses a method of measuring a weight of a molded product to determine that the molded product is defective when the weight exceeds a predetermined weight range. However, it is difficult to determine whether there is a defect if there is a fine variation in the weight according to the method of determining the defect by using the weight difference of the molded product. Also, to determine whether the molded product is defective only by measuring the weight may not be considered as a perfect method for determining the defect.

Therefore, there is a method of determining whether the molded product has a defect by additionally measuring a temperature of a mold.

When manufacturing a molded product, after injecting an injection resin in a mold and forming the molded product, a surface temperature of the mold or the molded product is measured. If the surface temperature exceeds a predetermined set temperature range, it may be identified that the molded product inevitably has a defect due to partial and locational temperature difference. Conventionally, a temperature sensor is provided on an outside of the mold to measure the surface structure; however, in this case, a separate temperature measuring apparatus has to be provided and thus manufacturing costs of the mold and installation costs for the mold forming increase.

PRIOR ART REFERENCE (Patent Reference 1) Korean Registered Patent No. 10-1, 478, 488

SUMMARY OF THE INVENTION

The present invention provides an apparatus for detecting whether a molded product has a defect by sensing a surface temperature of a mold or the molded product in a contact type or a non-contact type that irradiates an infrared ray, without installing a temperature sensor on an outside of the mold.

According to an aspect of the present invention, there is provided an apparatus for measuring a surface temperature of a molded product in an injection mold robot transfer apparatus that includes absorption tools for absorbing a mold and transferring the molded product after determining whether the molded product is defective, the apparatus including: a support bar for fixing the absorption tools and including a vertical recess; a crossbar fixed by the vertical recess of the support bar; a forward and backward shaft fixed by the crossbar; a bracket fixed by the forward and backward shaft; and a temperature sensor fixed on the bracket.

The crossbar may include a horizontal recess that is coupled and fixed to the vertical recess. The bracket may include an adjusting tool having an arc-shaped recess, a coupling plate may be mounted to the arc-shaped recess, and the temperature sensor may be mounted on the coupling plate. The coupling plate may be configured to twist within a recessed range defined by the arc-shaped recess and to be fixed by a fixing unit including a bolt in order to change a location of the temperature sensor. The temperature sensor may be one of a non-contact type infrared ray temperature sensor and a contact type temperature sensor.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
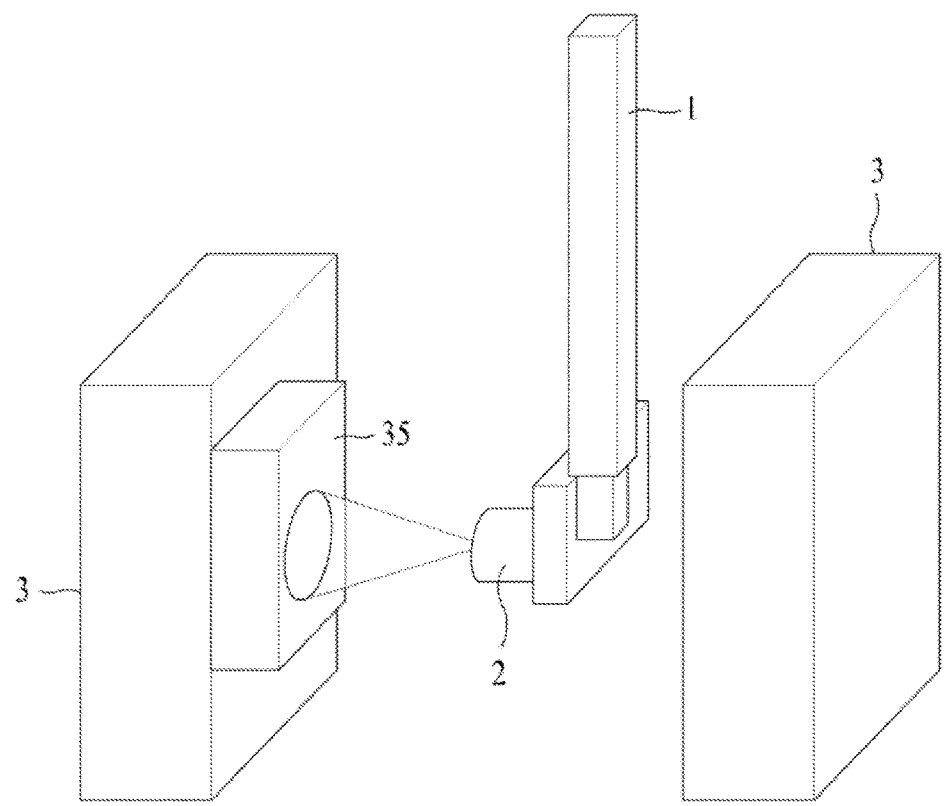
FIG. 1 is a schematic diagram showing that an apparatus for measuring a surface temperature is operated according to an embodiment of the present invention.

FIG. 1 is a schematic diagram of an apparatus for measuring a surface temperature according to an embodiment of the present invention.

As shown in FIG. 1, according to the embodiment of the present invention, a temperature sensor 2 is mounted on a robot arm 1 to measure a temperature by irradiating, for example, an infrared ray, to a separate mold 3 in which a molded product 35 is formed or the molded product 35. That is, a surface temperature of the mold 3 or the molded product 35 is measured in a non-contact type, for example, a temperature of a surface of a resin molded product and a surface of the mold, and then, a temperature value is displayed. Then, when the temperature value exceeds a predetermined set range, an alarm or data is provided to notify that the molded product has a defect.

Figure 2:
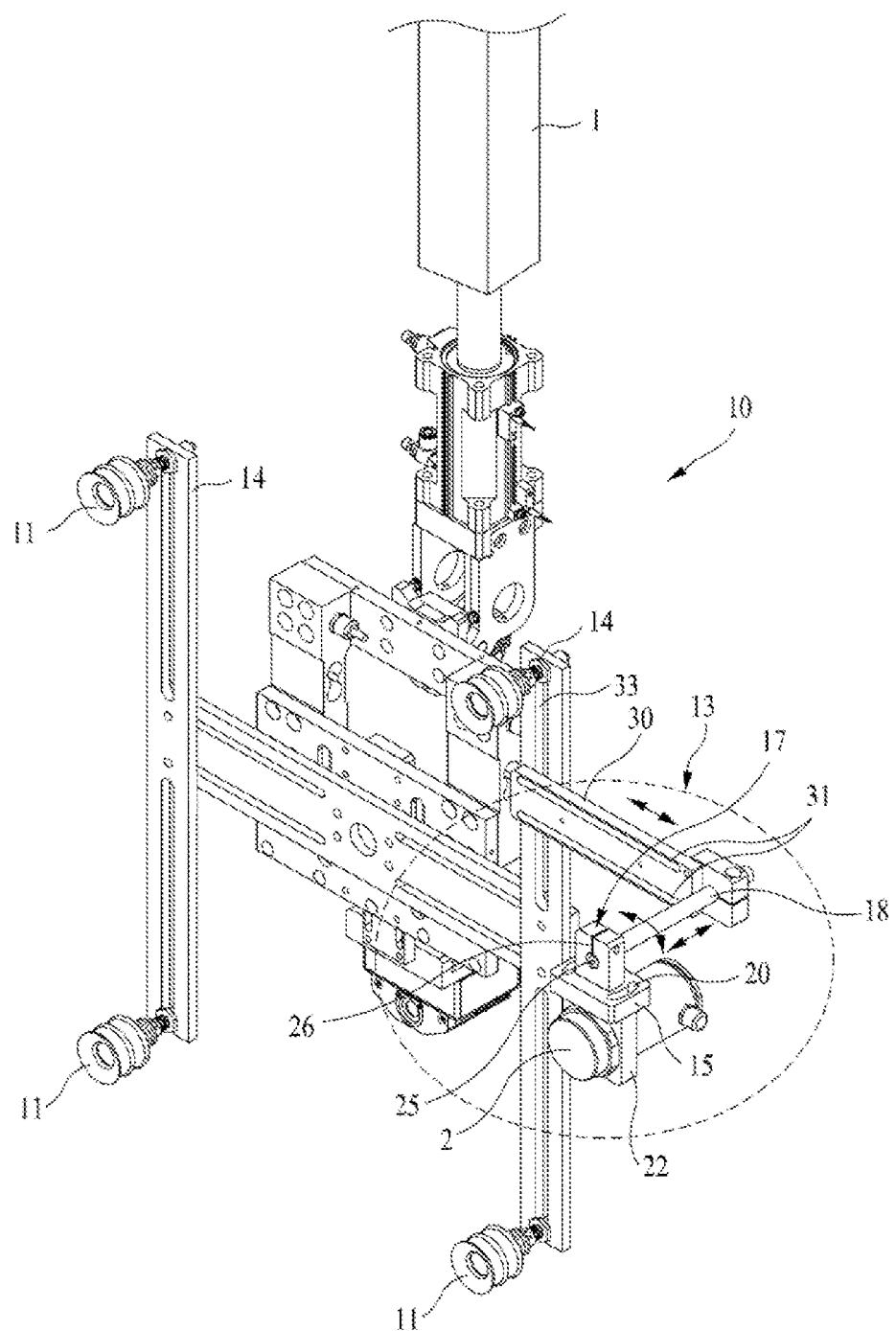
FIG. 2 is a block diagram showing principal elements of the apparatus according to the embodiment of the present invention.

FIG. 2 shows a robot transfer apparatus 10, in which an infrared ray temperature sensor is mounted.

The temperature sensor is mounted on the robot transfer apparatus 10 so as to measure a temperature of a molded product formed in an injection mold or a mold, and then, if the measured temperature of the mold or the molded product exceeds a standard deviation, it is determined that the molded product is defective and separately conveyed by the robot transfer apparatus 10 to a defective goods processing line.

As shown in the drawing, the robot transfer apparatus 10 includes absorption tools 11, for example, four absorption tools 11 so as to absorb the injection mold or the molded product formed in the injection mold. In addition, a temperature sensor transfer device 13, on which an infrared thermometer 2 is mounted, is positioned so as to focus an infrared laser beam onto the injection mold or the molded product, in a state where the injection mold or the molded product is absorbed by the robot transfer apparatus 10. The infrared thermometer 2 may be rotated to left and right directions and moved back and forth, upper and lower directions, and in a horizontal direction to adjust the focus of the laser point.

The left and right rotations of the infrared thermometer 2 may be adjusted by an adjusting tool 15 formed on a bracket 17. The adjusting tool 15 includes an arc-shaped recess 20 that is formed as an arc, and a coupling plate 22 for fixing the infrared thermometer 2 is provided under the arc-shaped recess 20. Therefore, the coupling plate 22 and the adjusting tool 15 are coupled and fixed with each other by using a screw via the arc-shaped recess 20. In order to turn the infrared thermometer 2 toward left or right side, the coupling plate 22 is twisted to left or right side within a recessed range of the arc-shaped recess 20, and then, the coupling plate 22 is fixed by using a screw via the arc-shaped recess 20.

The adjusting tool 15 is formed integrally with the bracket 17. In addition, the bracket 17 has a crack 26 that is partially cut from an upper portion to a lower portion of the bracket 17 and a coupling hole 25 formed under the crack 26 so as to be coupled to a forward and backward shaft 18 and fastened by a bolt. Thus, the bracket 17 is moved through the forward and backward shaft 18 to focus the laser point of the infrared thermometer 2.

Also, the forward and backward shaft 18 is provided on a crossbar 30, and the crossbar 30 may move to left and right sides and elevate up and down directions. The movements of the crossbar 30, on which the forward and backward shaft 18 is provided, in the left and right sides and in the up and down directions will be described below.

The movements of the crossbar 30 in the left and right sides and up and down directions may be performed by horizontal recesses 31 formed in the crossbar 30 and a vertical recess 33 formed in a support bar 14. The crossbar 30 is moved in the up and down directions through the vertical recess 33 of the support bar 14, and then, the crossbar 30 is moved to the left and right sides in a horizontal direction with respect to the support bar 14. After that, the crossbar 30 is fixed by using a fixing bolt penetrating through the vertical recess 33 and the horizontal recesses 31.

Figure 3A:
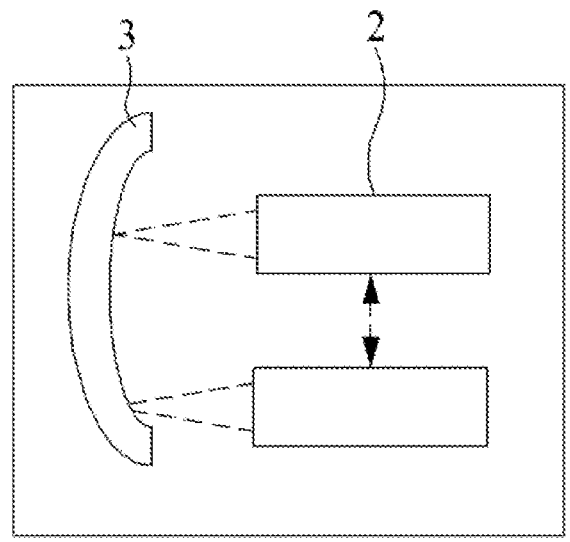
FIGS. 3A, 3B, and 3C are diagrams exemplarily showing a method of sensing an external temperature of a mold or a molded product.
Figure 3B:
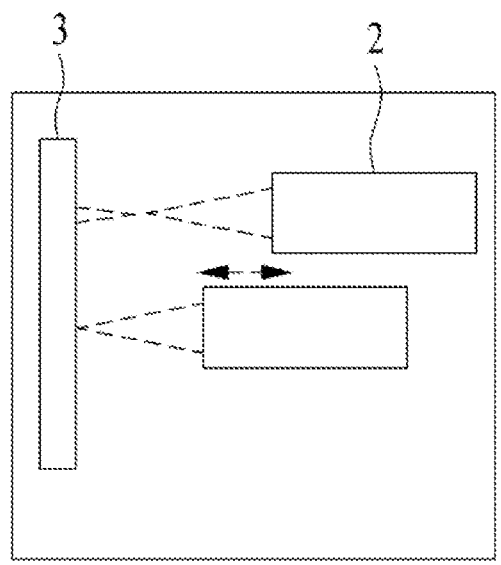
Figure 3C:
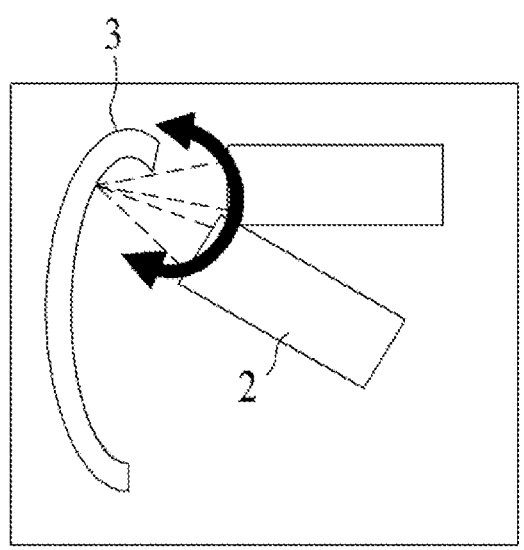

According to the above apparatus, as shown in FIGS. 3A, 3B, and 3C, the location of the infrared thermometer 2 may be freely changed to up and down directions, back and forth, and to be inclined according to a shape of the mold or the molded product, and accordingly, a temperature of the mold or the molded product may be measured accurately.

For example, when the infrared thermometer 2 is wanted to be slanted as shown in FIG. 3C, the bracket 17 is rotated at a predetermined angle with respect to the forward and backward shaft 18 and the coupling plate 22 on which the infrared thermometer 2 is provided is turned at a predetermined angle within the arc-shaped recess 22. Then, the infrared thermometer 2 may be located in an inclined position as shown in FIG. 3C.

Figure 4:
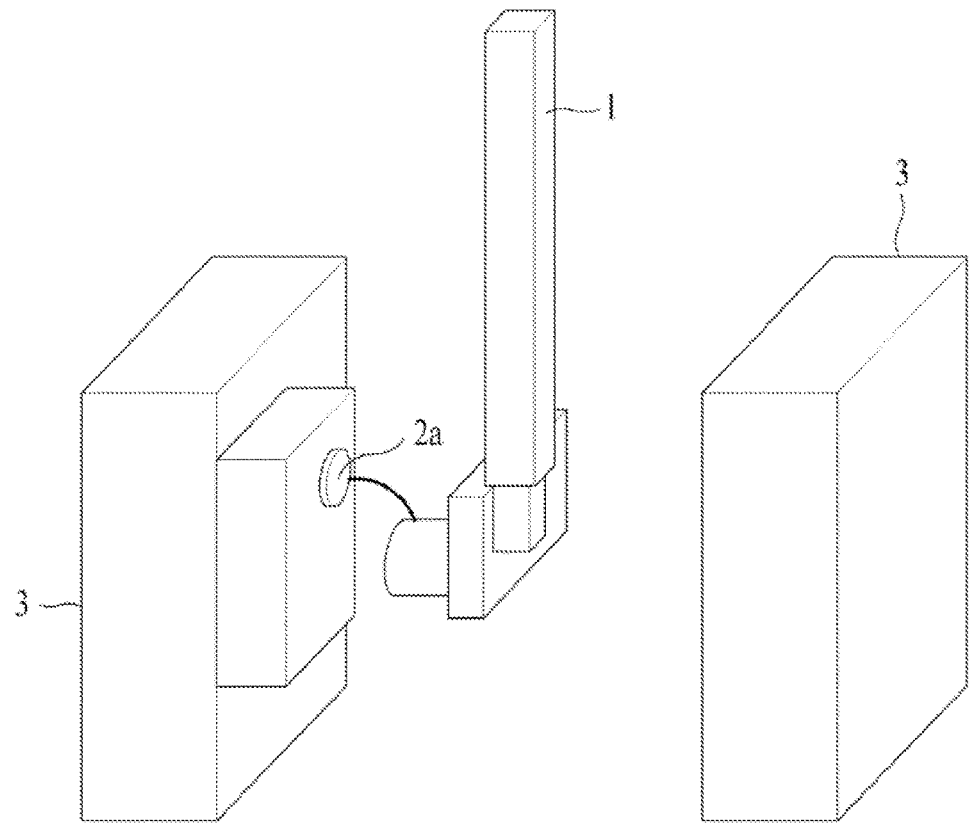
FIG. 4 is a schematic diagram showing that an apparatus for measuring a surface temperature is operated according to another embodiment of the present invention.

The temperature measurement performed by the temperature sensor may use the temperature sensor of a non-contact type using the infrared ray, but is not limited thereto. That is, the temperature may be measured by using other types of temperature sensors. For example, FIG. 4 shows an example in which the temperature sensor 2a is a contact-type temperature sensor, not the infrared ray temperature sensor. In FIG. 4, the temperature sensor 2a directly contacts the mold 3 to measure the temperature.

The temperature measurement may be performed with respect to the molded product, not the mold 3.

According to the above apparatus, the temperature sensor is provided on the robot transfer apparatus 10, and thus, there is no need to install an additional temperature measuring apparatus for measuring a temperature of the mold or the molded product. Therefore, manufacturing costs may be reduced and a time taken for measuring the temperature may be reduced, and accordingly, productivity of the apparatus may be improved.

Also, the location of the infrared thermometer 2 may be changed to all directions, for example, back and forth, left and right, up and down directions, and inclined direction. Thus, the temperature of any type of mold or molded product that is a measurement target may be freely and conveniently measured.

In addition, when the measured temperature exceeds the standard deviation, it is determined that the molded product is defective and separately transferred as a defect by the robot transfer apparatus 10.

As described above, according to the present invention, there is no need to build a temperature sensor in each mold, and thus, costs for manufacturing the mold and a time taken to manufacture the mold may be reduced.

Also, according to the present invention, the location of the temperature sensor for measuring a surface temperature of the mold and the molded product may be changed to all directions, for example, back and forth, left and right, up and down directions, and inclined direction, and thus, the temperature of any type of mold 3 or the molded product that is the measurement target may be freely and conveniently measured.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An apparatus for measuring a surface temperature of a molded product, the apparatus comprising:
   a support bar including a vertical recess;
   an absorption tool vertically movably attached to the vertical recess of the support bar, the absorption tool being configured to hold an injection mold having a molded product;
   a crossbar vertically movably attached to the vertical recess of the support bar, the crossbar being extended perpendicular to the vertical recess of the support bar;
   a forward and backward shaft horizontally movably attached to the crossbar, the forward and backward bar being extended perpendicular to both the vertical recess and the cross bar;
   a bracket attached to and movable along the forward and backward shaft, the bracket being configured to rotate around an axis of the forward and backward shaft; and
   a temperature sensor attached to the bracket, the temperature sensor being configured to face the molded product and rotate around a vertical axis thereof,
   wherein the apparatus is configured to measure a surface temperature of the molded product and determine that the molded product is defective when the measured surface temperature exceeds a predetermined standard deviation.

2. The apparatus of claim 1, wherein the crossbar comprises a horizontal recess, the backward and backward shaft is attached movably along the horizontal recess of the cross bar.

3. The apparatus of claim 1, wherein the bracket comprises an adjusting tool having an arc-shaped recess, a coupling plate is rotatably mounted to the arc-shaped recess, and the temperature sensor is mounted on the coupling plate.

4. The apparatus of claim 3, wherein the coupling plate is configured to twist within a recessed range defined by the arc-shaped recess in order to change a location of the temperature sensor and to be fixed by a fixing unit including a bolt.

5. The apparatus of claim 1, wherein the temperature sensor is one of a non-contact infrared ray temperature sensor and a contact temperature sensor.

\* \* \* \* \*